United States Patent [19]

Kondo et al.

[11] Patent Number: 4,835,604
[45] Date of Patent: May 30, 1989

[54] AIRCRAFT SERVICE SYSTEM WITH A CENTRAL CONTROL SYSTEM FOR ATTENDANT CALL LIGHTS AND PASSENGER READING LIGHTS

[75] Inventors: Yoshiyuki Kondo, Tokyo; Hiroshi Sahara, Kanagawa; Yasuhiro Hidejima, Tokyo, all of Japan

[73] Assignee: Sony Corporation, Tokyo, Japan

[21] Appl. No.: 149,094

[22] Filed: Jan. 26, 1988

[30] Foreign Application Priority Data

Feb. 23, 1987 [JP] Japan .................................. 62-39772

[51] Int. Cl.$^4$ .......................... H04N 5/64; H04N 7/18
[52] U.S. Cl. ...................................... 358/86; 358/254; 455/5
[58] Field of Search .................... 358/86, 93, 115, 254, 358/255; 297/146, 163, 191; 340/988, 995, 996; 455/3, 4, 5, 6

[56] References Cited

U.S. PATENT DOCUMENTS

| | | |
|---|---|---|
| 3,602,891 | 8/1971 | Clark et al. . |
| 3,757,225 | 9/1973 | Ulicki . |
| 3,997,718 | 12/1976 | Ricketts et al. . |
| 4,247,106 | 1/1981 | Jeffers et al. . |
| 4,428,078 | 1/1984 | Kuo . |
| 4,513,315 | 4/1985 | Dekker et al. . |
| 4,521,021 | 6/1985 | Dixon . |
| 4,554,579 | 11/1985 | Citta . |
| 4,573,072 | 2/1986 | Freeman ................................ 358/86 |
| 4,584,603 | 4/1986 | Harrison . |
| 4,591,906 | 5/1986 | Morales-Garza et al. . |
| 4,647,980 | 3/1987 | Steventon et al. . |
| 4,684,981 | 8/1987 | Toyoshima et al. . |

FOREIGN PATENT DOCUMENTS

| | | |
|---|---|---|
| 103438 | 3/1984 | European Pat. Off. . |
| 144770A | 6/1985 | European Pat. Off. . |
| 3426893 | 1/1986 | Fed. Rep. of Germany . |
| 54-105499 | 7/1979 | Japan . |
| 57-199369 | 12/1982 | Japan . |
| 59-15387 | 1/1984 | Japan . |
| 59-15388 | 1/1984 | Japan . |
| 2158610 | 4/1984 | United Kingdom . |
| 2162724 | 7/1985 | United Kingdom . |

OTHER PUBLICATIONS

"Design Technique for Multiplexing Asynchronous Digital Video and Audio Signal," by J. H. Stott, IEEE Transactions on Communications, vol. COM-26, No. 5, May, 1978.

Boeing Electronics Company Brochure Entitled "Putting the Future of Passenger Services and Entertainment at Your Fingertips," 1987, Six Pages.

Boeing, "Proceedings of the SCAR Conference, Part 2," Mar., 1977, pp 854 and 864.

Primary Examiner—Tommy P. Chin
Attorney, Agent, or Firm—Limbach, Limbach & Sutton

[57] ABSTRACT

A system and method for providing service in an aircraft having a plurality of passenger seats. The system of the invention includes a plurality of attendant call lights each serving a different one of the passenger seats, a plurality of reading lights each serving a different one of the passenger seats, a plurality of switch units each for controlling one of the attendant call lights and one of the reading lights, and a plurality of terminal units each provided at a different one of the passenger seats. Each terminal unit has an atttendant call key, a reading light key, and an address generator, and is capable of generating a request signal including an address in response to operation of the attendant call key or the reading light key. The inventive system also includes a head end apparatus capable of generating a control signal for controlling one of the attendant call lights or reading lights in response to each request signal. Each such control signal includes a seat address identifying one of the lights.

18 Claims, 10 Drawing Sheets

Terminal Apparatus

AIRCRAFT SERVICE SYSTEM WITH A CENTRAL CONTROL SYSTEM FOR ATTENDANT CALL LIGHTS AND PASSENGER READING LIGHTS

FIELD OF THE INVENTION

This invention relates to an aircraft service system with a central control system for attendant call lights and passenger reading lights.

BACKGROUND OF THE INVENTION

It is conventional to provide an aircraft used for international air travel with an audio/video system for entertaining passengers during flights of long duration. It is also conventional for such aircraft to include passenger service units (PSU's) including a reading light for each passenger and an attendant call light for each passenger for use in attending to each passenger's requests.

However, in conventional aircraft, the audio/video system is separate from the reading light and attendant call light system, so that the arrangement of the combination of the two systems is complicated. Further, since conventional PSU's are connected in cascade, the reading lights and the attendant call lights in such conventional units respond so late that passengers are often inconvenienced.

Further, in conventional aircraft there is only one attendant call light provided per column of passenger seats, so that it is difficult to know which passenger in a column of seats is calling an attendant.

SUMMARY OF THE INVENTION

The aircraft service system of the invention solves the above-mentioned problems. In a preferred embodiment, the system of the invention includes:

(a) a plurality of attendant call lights each serving a different passenger seat in an aircraft;

(b) a plurality of reading lights each serving a different one of the passenger seats;

(c) a plurality of switch units, each controlling one of the attendant call lights and one of the reading lights;

(d) a plurality of terminal units, each provided at a different one of the passenger seats, each terminal unit having an attendant call key, a reading light key, a means for generating an address identifying one of the passenger seats, a means for generating a request signal including the address in response to operation of the attendant call key or the reading light key;

(e) a head end apparatus including a control signal generating means, wherein said control signal generating means is capable of generating an attendant call light control signal in response to each request signal generated in response to operation of one of the attendant call keys and a reading light control signal in response to each request signal generated in response to operation of one of the reading light keys, and wherein each said control signal includes a seat address identifying one of the lights;

(f) means for transmitting the request signals from the terminal units to the control signal generating means; and (g) a means for transmitting each control signal to the switch unit controlling the light identified by the seat address included in said each control signal.

These and other features and advantages of the present invention will become apparent from the following detailed description of the preferred embodiment taken in conjunction with the accompanying drawings, throughout which like reference numerals designate like elements and parts.

BRIEF DESCRIPTION OF THE DRAWINGS

Each of FIGS. 1A and 1B is a block circuit diagram showing the whole arrangement of an embodiment of an aircraft service system according to the present invention.

Each of FIGS. 6A and 6B is a block circuit diagram showing the whole arrangement of another embodiment of a service system according to the present invention.

DESCRIPTION OF THE PREFERRED EMBODIMENTS

An embodiment of a service system according to the present invention for use in an aircraft will hereinafter be explained with reference to FIGS. 1A and 1B.

Figure 1A:
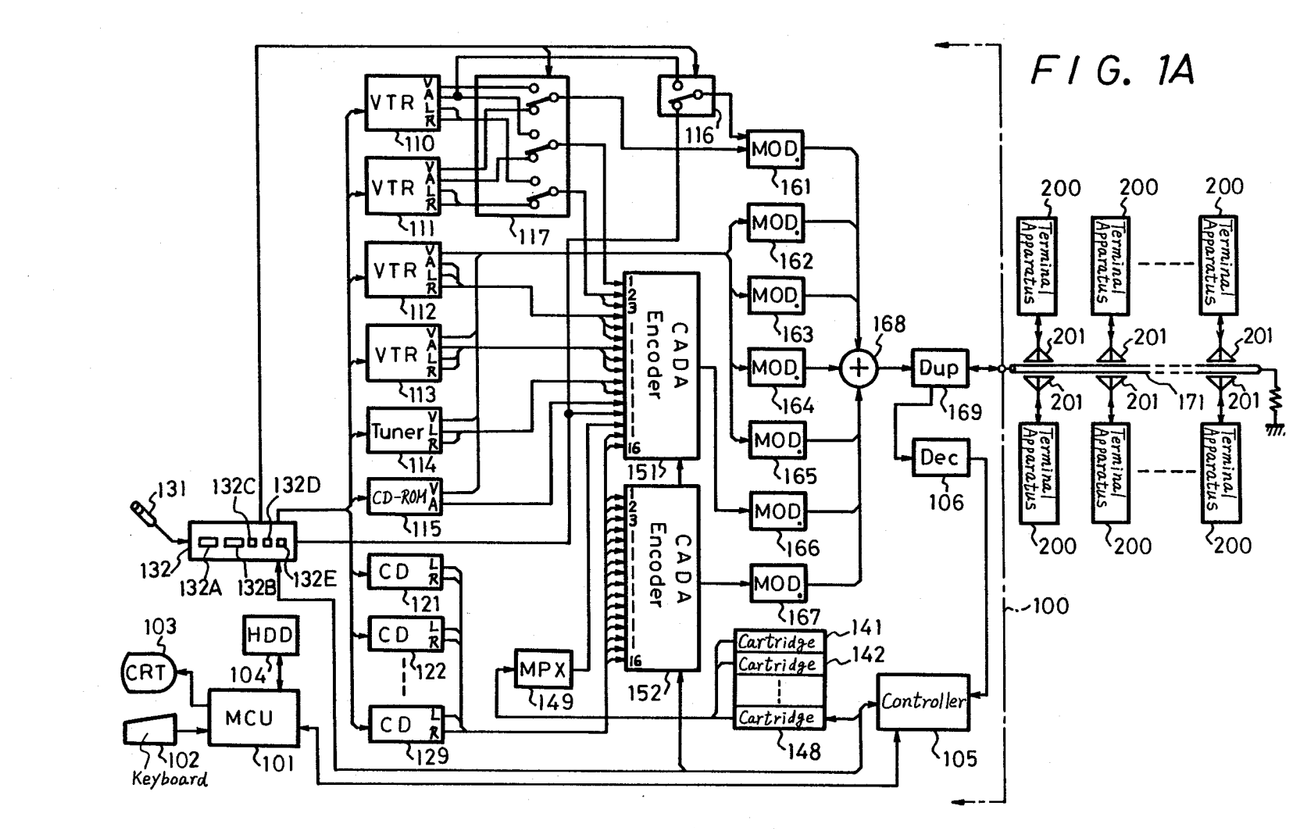
Figure 1B:
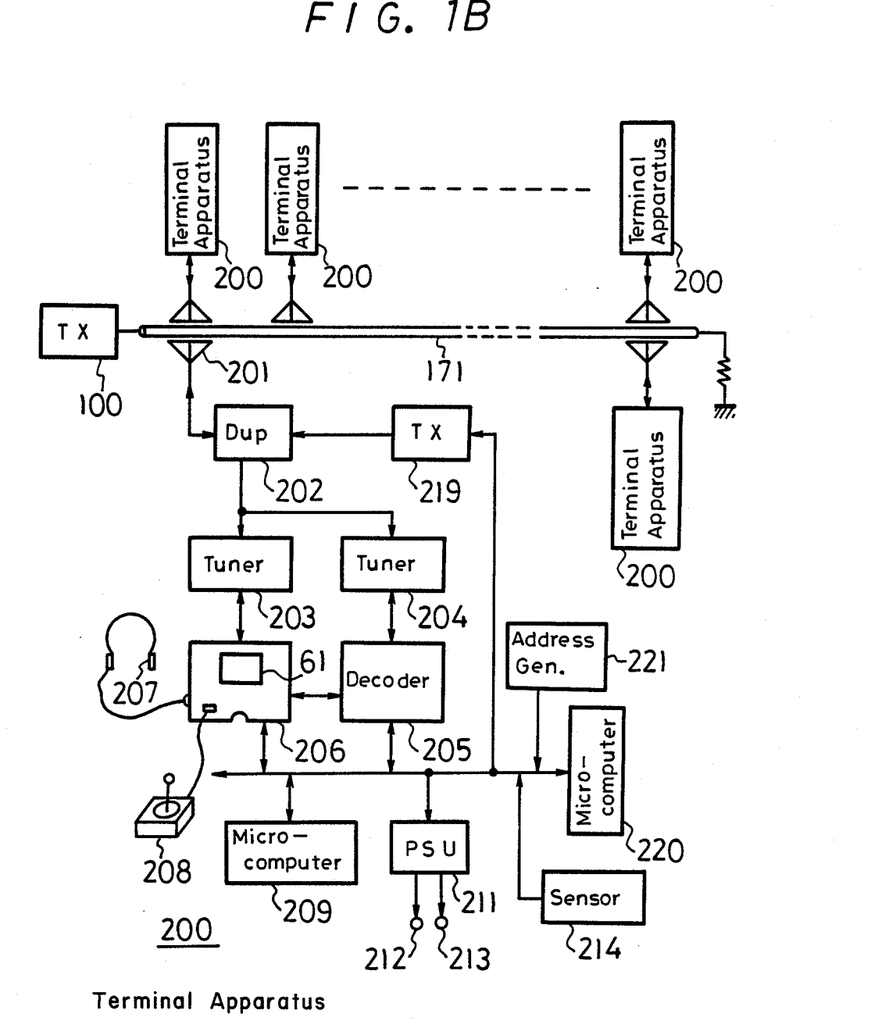

In FIGS. 1A and 1B, reference numeral 100 designates a transmitter provided in a crew's room or the like in an aircraft, and each numeral 200 designates a terminal unit serving a different one of the aircraft passenger seats. The embodiment of FIGS. 1A and 1B includes a frequency-division-multiplex system including seven "down" channels for transmitting signals from transmitter 100 to terminal units 200 and two "up" channels for transmitting signals from terminal units 200 to transmitter 100. The down channels are used to transmit a variety of information signals, control signals and polling signals. On the other hand, the up channels are used both to transmit data generated by the passengers at arbitrary times from the terminal units 200, and data generated in response to polling signals from transmitter 100.

In transmitter 100, reference numerals 110-113 designate video tape recorders (VTRs) each of which may be an 8 mm video tape recorder, for example. VTR 110 is used for the override operation and is loaded with a cassette tape explaining how to put on a life-jacket or the like. Each of video tape recorders 111, 112, and 113 is loaded with a cassette tape of a video program such as a movie.

Each of video tape recorders 111, 112, and 113 is respectively provided with a terminal V for outputting a reproduced video signal and with terminals L, R and A for outputting reproduced audio signals.

Video tape recorders 110 through 113 supply video signals V, stereo audio signals L and R in a first language, and monaural audio signals A in a second language.

Reference numeral 114 designates a television tuner, and 115 a still image reproducer, e.g. a CD-ROM player, which is loaded with a compact disk in which airport maps, various procedures, and other information may be recorded. Each of units 114 and 115 supplies video signals V and audio signals L, R and A.

Reference numerals 121-129 designate compact disk (CD) players which supply stereo audio signals L, R, which may be music signals, for example.

The FIG. 1A system includes microphone 131 for making announcements from within the cabin, AV control unit 132, announce switch 132A, override switch 132B, and pause switches 132C-132E for commanding VTRs 111-113 to stop or pause.

The FIG. 1A system also includes memory units 141-147 (each of which may be, for example, a ROM cartridge for use in a conventional personal computer such as the MSX standard personal computer) in which software programs such as games or the like may be written, and RAM cartridge 148 in which may be stored programs and data such as a menu or the like indicating services available in the cabin. The programs and data from cartridges 141-148 are time-division-multiplexed by multiplexer 149 for transmission as a serial signal to CADA encoder 151, as will be described later.

CADA (cable digital audio/data transmission) encoders 151 and 152 encoders, are of the type described in U.S. Pat. No. 4,684,981, issued Aug. 4, 1987 to Toyoshima, et al. Each of CADA encoders 151 and 152 pulse code modulates ("PCM-codes") and time-division-multiplexes 16-channel monaural audio signals (or 8-channel stereo audio signals) and a command signal (to be described below) for controlling one or more of terminal units 200. The multiplexed signals generated in each of units 151 and 152 have substantially the same band width as that of the ordinary video signal. The format of the PCM signals generated in units 151 and 152 will be described later.

The FIG. 1A system also includes modulators 161 through 167 each of which preferably includes an amplitude modulator of the type that produces VSB (vestigial sideband) signals, duplexer 169 which separates signals in the down channels and those in the up channels, and controller 105 comprising a microcomputer for controlling the above-mentioned respective circuits and the terminal units 200. The controller 105 is supplied with commands, data, and other signals from the terminal units 200 through duplexer 169 and demodulator 106.

Master control unit 101 comprises a microcomputer for centrally controlling nd monitoring operation of the overall system including transmitter 100 and terminal units 200. For this purpose, master controller 101 is connected with controller 105, keyboard 102 for inputting data, CRT display 103 for monitoring data, and external storage unit 104, which may be a floppy disk drive or a hard disk drive (HDD).

Normally, the video signal V from the VTR 111 is supplied to modulator 161 through a switching circuit 117. On the other hand, video signals V from VTRs 112-115 are respectively supplied to modulators 162-165 to be modulated in the same manner as are video signals to be broadcast in an ordinary television broadcasting system. Modulators 161-165 output modulated signals, of the type broadcast by ordinary television broadcast systems, each occupying a different frequency channel. These modulated signals are supplied to adder 168.

Audio signals L, R, and A from video tape recorder 11 are supplied to CADA encoder 151 through switching circuit 117. Audio signals L, R and A from video tape recorders 112-115 and compact disk players 121-129 and output signals from multiplexer 149 are supplied to encoders 151 and 152 wherein these signals are converted into two time-division-multiplexed signals. These time-division-multiplexed signals are respectively supplied to modulators 166 and 167 to be modulated, so that modulated signals occupying vacant channels (i.e., channels other than those occupied by the modulated signals produced in modulators 161 through 165) emerge from units 166 and 167. The modulated signals emerging from units 166 and 167 are then supplied to adder 168.

Adder 168 thus frequency-multiplexes the modulated signals from the modulators 161 and 167 and outputs the resulting multiplexed signal.

This multiplexed signal is delivered through duplexer 169 to a leaky cable 171 as a signal for the down channels. Leaky cable 171 is preferably a coaxial cable having a spirally indented periphery so as to leak signals transmitted therein.

Leaky cable 171 is thus usually supplied with frequency-multiplexed video signals V from the VTRs 111-115 as well as encoded audio signals L, B and A reproduced from VTRs 111-115 and CD players 121-129, and programs and data from cartridges 141-148 which are time-division-multiplexed before they are frequency-multiplexed.

To make an announcement in the cabin, announce switch 132A is turned on. Actuation of switch 132A automatically generates a control signal for placing VTRs 111-115 and CD players 121-129 into a pause or stop mode, muting the circuits for reproducing their signals, and setting switching circuit 116 into the state shown in FIG. 1A so that a voice signal from microphone 131 is supplied from unit 132 through switching circuit 116 to modulator 161 to be modulated to an FM signal similar to the audio signal component of an ordinary broadcast television signal. This FM signal is supplied to the adder 168.

In this event, the voice signal from microphone 131 is also supplied from unit 132 to encoder 151, and the controller 105 supplies encoders 151 and 152 with a command signal indicative of an announce mode on the basis of a signal supplied from unit 132 which is indicative of actuation of announce switch 132A.

When an announcement is made in the cabin, a voice signal representative of the announcement is added to the signals normally supplied to adder 168 and a command signal indicative of the announce mode is delivered by modulator 161 and encoder 151.

When the announce switch 132A is turned off, the system is returned to the normal operating mode described above.

When override switch 132B is turned on to effect an override operation, VTRs 111-115 and CD players 121-129 are set into a pause or stop state and VTR 110 is set into a reproducing state by a control signal from unit 132, and switching circuits 116 and 117 are set into the state opposite the state shown in FIG. 1 by a control signal from unit 132 so that the reproduced signals V, L, R and A from the VTR 110 are supplied to modulator 161 and encoder 151.

In this event, controller 105 supplies encoders 151 and 152 with a command signal indicative of an override mode in response to a signal supplied from unit 132 which is indicative of actuation of the override switch 132B.

Thus, when an override operation is effected, the reproduced signals V, L, R and A from VTR 110 are transmitted in place of those signals from VTR 111 which are transmitted during the system's normal operating mode, and a command signal indicative of the override mode is also transmitted.

When the announce switch 132A is turned on during an override operation, switching circuit 116 and encoders 151 and 152 are controlled in such a manner that the voice signal from microphone 131 is transmitted in preference to the audio signals L, R and A from VTR 110.

A terminal unit 200 is provided for each passenger seat, and leaky cable 171 is arranged along the passenger seats.

In the terminal 200 shown in FIG. 1B, reference numeral 201 designates a transmitting and receiving antenna (or "coupler") which is arranged in the vicinity of the cable 171 so as to couple inductively with cable 171 for transmitting and receiving signals to and from transmitter 100 and terminal unit 200.

Tuner 203 selects any desired one of the modulated signals from modulators 161-165 and demodulates the original video signal V (and the audio signal A) from the selected modulated signal. Tuner 204 selects any desired one of the modulated signals from modulators 166 and 167 and demodulates the original time-division-multiplexed signal, that is, the time-division-multiplexed signal from the encoder 151 or 152, from the selected modulated signal.

Decoder 205 performs the inverse operations to the operations performed in encoders 151 and 152. Selection indicating apparatus 206 has a color display 61, and a variety of operational switches and connectors to which a head phone 207 and a joy stick 208 can be connected.

Personal computer 209, which may a personal computer of e.g. the MSX standard, performs display processing for color display 61. Each terminal unit 200 of the FIG. 1B system also includes passenger service unit (PSU) 211, reading light 212, attendant call light 213, transmitter 219 for the up channels, sensor 214 for detecting passenger conditions, such as whether a passenger is sitting on each seat, whether the seat belt at each is correctly fastened, and the like, microcomputer 220 for controlling the whole terminal unit 200, and address generator 221 for generating the address of the terminal unit 200 at which address generator is located. Each PSU 211 includes a switch unit for controlling each of lights 212 and 213.

Figure 2:
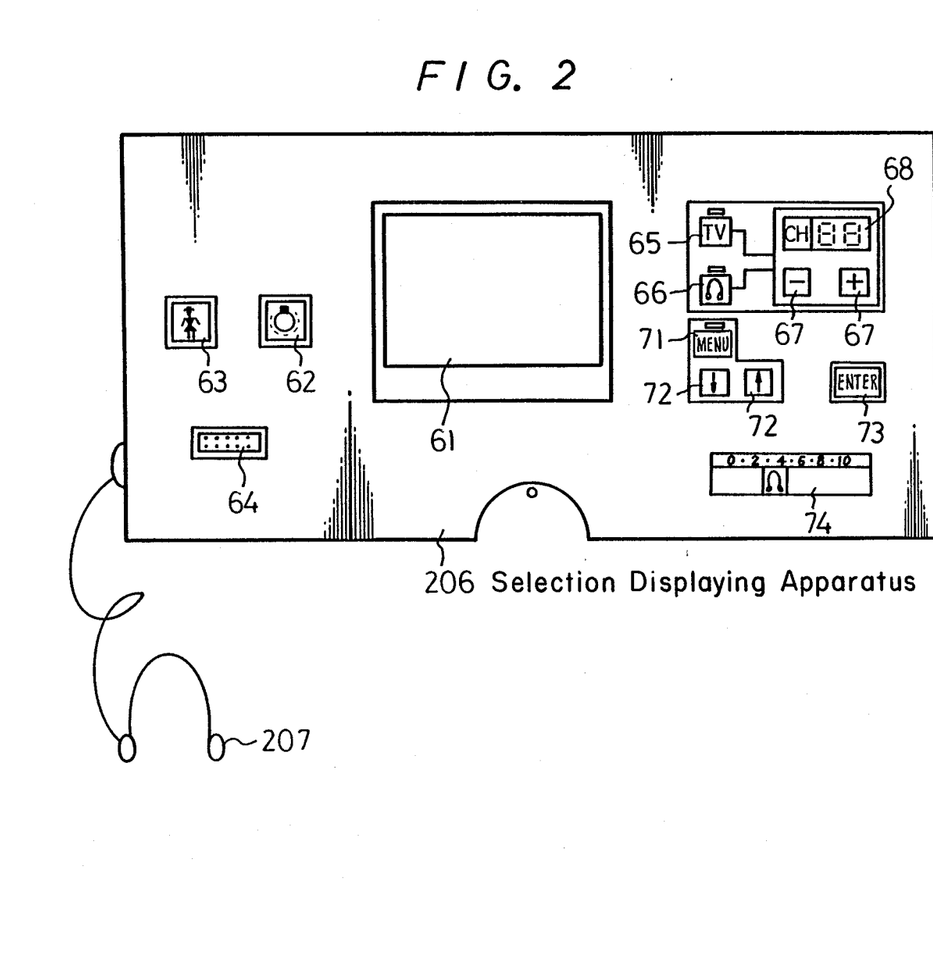
FIG. 2 is a plan view showing a selection indicating apparatus included in the system of FIGS. IA and 1B.

FIG. 2 shows a preferred embodiment of selection indicating apparatus 206 of the FIG. 1A/1B system. Color display 61 may be, for example, an index-beam type flat television picture tube (CRT). Reference numeral 62 designates a reading light switch, 63 an attendant call switch, and 64 a connector to which joy stick 208 (shown in FIG. 1B) may be connected.

Television switch 65 selects the reproduced signals V, L, R and A from the VTRs 111-115, music switch 66 selects the reproduced signals L, R from CD players 121-129, channel up/down switches 67 select desired ones of the reproduced signals (channels) selected by the switch 65 or 66, and indicator 68 digitally indicates a channel number corresponding to a channel selected by switches 67.

Menu switch 71 displays a menu on display 61, cursor keys (switches) 72 move a cursor up and down on display 61, enter key 73 validates an item specified by the cursor, and sliding adjuster 74 adjusts the volume of head phones 207.

Figure 3:
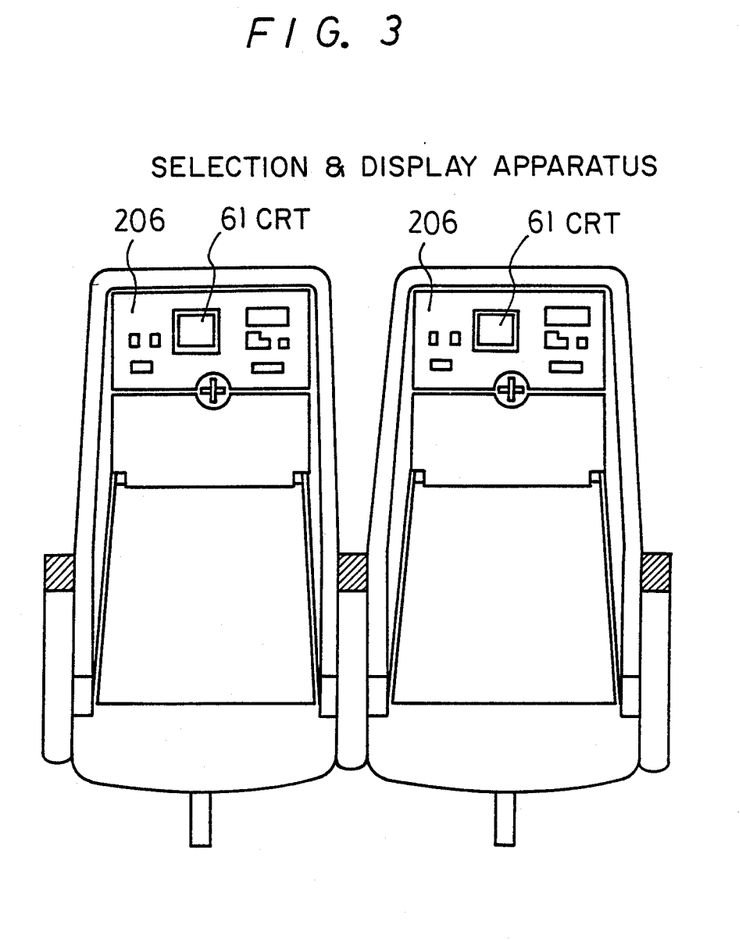
FIG. 3 is a plan view of two units of the selection indicating apparatus of the invention, each mounted on the rear surface of a different passenger seat.

Each selection indicating apparatus 206 is preferably installed on the back of a passenger seat in front of the passenger using such apparatus 206, as shown in FIG. 3.

In the system's normal operating mode, the frequency-multiplexed signal delivered to leaky cable 171 is picked up by the antenna 201 and supplied to the tuners 203 and 204 through a duplexer 202.

When switch 65 is pressed, the terminal unit 200 is set into a television mode. Next, switches 67 are pressed to select one of the output signals from modulators 161-165, that is, one of the reproduced signal V from the VTRs 111-115. The act of pressing switches 67 causes tuner 203 to supply the selected signal V to display 61. At the same time, one of the output signals from modulators 166 and 167 is selected in tuner 204 and the output signal from the appropriate one of encoders 151 and 152 is supplied to decoder 205 wherein the audio signals L, R and A of the channel selected by the switches 67 are decoded and supplied through selection indicating apparatus 206 to head phones 207.

Thus, by repeatedly operating switches 65 and 67, the passenger can select a desired one from the signals reproduced from the VTRs 111-115.

When switch 66 is pressed, the terminal unit 200 is set into a music mode. After switch 66 has been pressed, one of the output signals from modulators 166 and 167 is selected in tuner 204 by pressing switches 67 and the output signal from appropriate one of encoders 151 and 152 is supplied to decoder 205 wherein audio signals L, R and A of the channel selected by the switches 67 (that is, the output of the one of CD players 121-129 selected by the switches 67) are decoded, and the signals L, R are supplied through apparatus 206 to head phones 207.

When menu switch 71 is pressed, the menu program and related data stored in cartridge 148 are supplied from decoder 205 to personal computer 209 for executing the menu program. Consequently, the display 61 displays the menu. By moving the cursor to a desired game name in the menu using the cursor keys 72 and then pressing the enter key 73, the selected game program, that is, one of the programs provided in the cartridges 141-147 is loaded from decoder 205 into personal computer 209. Thereafter, the passenger can play the game using joy stick 208.

As described above, the passengers can freely utilize VTRs 111-115, CD players 121-129 and game programs in cartridges 141-147 in the system's normal operating mode.

A signal including data indicative of software usage at each terminal unit 200 is sent automatically from microcomputer 220 to transmitter circuit 219 to be transmitted over the up channel. Each such signal is then supplied through duplexer 202, antenna 201, cable 171, and duplexer 169 to decoder 106 wherein the original software usage data is decoded. The data thus decoded is supplied through controller 105 to unit 101 for use in monitoring and managing the software usage at each seat.

When the announce mode is effected, a command signal indicative of the announce mode is delivered through the down channel to each of terminal units 200. The command signal is decoded in each decoder 205. Decoder 205 is forced by the command signal to select the channel through which the announce voice signal is transmitted from microphone 131 through encoder 151 to the terminal units 200. This voice signal is supplied to head phones 207. During an announce operation, the volume of the signal at head phones 207 may be controlled so as to be unaffected by the position of volume adjuster 74.

If encoder 151, encoder 152, or decoder 205, is disabled due to a malfunction or the like, the announce audio signal A from modulator 161 is automatically selected.

Also during the announce mode, a video signal V representative of an image corresponding to the announcement is extracted from CD-ROM player 115 and forcedly received by tuner 203. Then, the video signal V is supplied to display 61 to display a still image corresponding to the announcement.

When an announce operation is terminated, each terminal unit 200 is returned to the state it was in before the announce mode, in response to receipt of a command signal indicating termination of the announce operation.

When an override operation is effected, the signals V, L, R and A from VTR 110 are forcedly selected by a command signal indicative of the override operation, in the same manner as for the announce operation. The signal V is supplied to display 61 and the signals L, R and A to head phones 207.

Further, when reading light switch 62 is pressed, microcomputer 220 generates a request signal which indicates the number of the seat at which the reading light switch 62 has been pressed. An address from address generator 221 is added to the request signal and the request signal (with address) is transmitted to controller 105 through the up channel. Controller 105 generates a command signal (including the seat number) for lighting the reading light 212 corresponding to the seat number on the basis of the request signal transmitted thereto. The command signal for lighting reading light 212 is transmitted through the down channel to the terminal units 200. The decoder 205 of the terminal unit at which switch 62 has been pressed detects the coincidence between its seat number and the seat number included in the command signal for lighting the reading light 212 and decodes the command signal. The decoded command signal is then supplied to PSU 211 to control a switch therein to turn on the reading light 212.

At this time, controller 105 supplies unit 101 with data indicating that reading light switch 62 has been pressed and data indicative of the seat number of the corresponding seat so that unit 101 may collect and process information regarding which of reading lights 212 have been lighted and which have been extinguished. This information may be displayed on display 103 so that the crew can quickly confirm at which seats the reading light 212 is lit.

A request signal for extinguishing a desired one of reading lights 212 is generated by pressing switch 62 again. The process for extinguishing reading light 212 is the same as that described above for turning on reading light 212.

If a request signal for turning on or off a certain reading light 212 is entered using keyboard 102 and supplied from keyboard 102 to controller 105, a command signal is generated in controller 105. This command signal, which includes a command to turn on or off the reading light 212 and the light's seat number, is supplied through the down channel to the corresponding terminal unit 200, and the appropriate reading light 212 is turned on or off in response to the signal. Accordingly, a reading light 212 or the like at each seat can be controlled from unit 101.

Also, when attendant call switch 63 is pressed, call light 213 is lit, and the attendant call requests are processed by units 105 and 101 and displayed on display 103 in the same manner as when reading light switch 62 is pressed to request that reading light 212 be turned on or off.

Therefore, the crew can quickly determine by examining display 103 each seat at which the attendant call switch 63 has been pressed without going to the passenger cabin.

Moreover, the seat condition detected by each sensor 214 is also transmitted to controller 105 with the corresponding seat number for forwarding to unit 101 for processing.

As described above, according to the present invention, when a passenger operates switch 62 or 63, transmitter 100 centrally processes each passenger request signal (which may be a request for controlling one of lights 212 or 213). Since transmitter 100 centrally monitors and processes the passenger request signals, the passenger requests can be quickly detected and promptly acted upon.

The passenger requests are centrally monitored by display 103, (i.e., each passenger's seat is provided with an attendant call light 213 whose status is monitored by display 103), so that it is possible to determine easily which passenger has requested a service and accordingly improve the services provided to the passengers.

Further, since the service system of the invention is preferably combined with a passenger audio/video system, the combined system is simpler and has broader capability than if the two systems would be separately provided.

Next, the signal format of the time-division-multiplexed signals outputted by encoders 151 and 152 will be explained with reference to FIGS. 4A-4C. The signal format is improved from that disclosed in aforementioned U.S. Pat. No. 4,684,981.

Figure 4A:
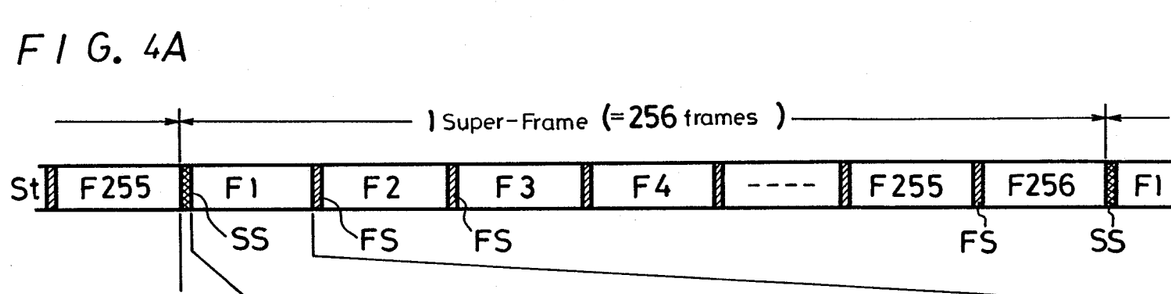
FIGS. 4A-4C and 5A-5D are diagrams showing signal formats used in the system of the invention.
Figure 4B:
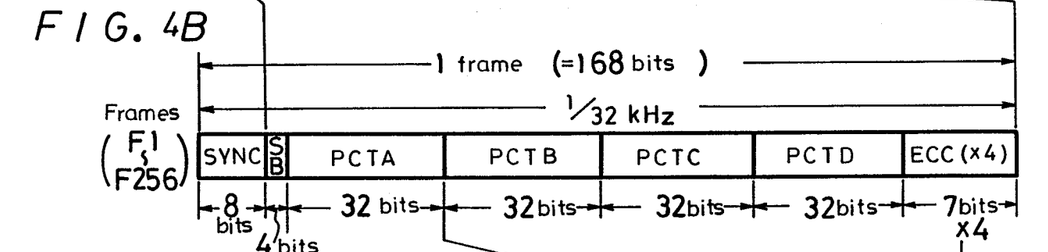

Multiplexed signal St shown in FIG. 4A, is a serial binary signal formed of a number of super-frames. One super-frame thereof is formed of 256 frames F1 through F256. As shown in FIG. 4B, each frame includes 168 bits and the cyclic period of one frame is $(32 \text{ kHz})^{-1}$. Each frame has an 8-bit synchronizing code SYNC, followed by a 4-bit service bit SB, followed by four 32-bit data packets PCTA-PCTD, followed by four 7-bit error correcting codes (ECCs).

There are two kinds of synchronizing code SYNC as shown in FIG. 4A: a super-frame-sync SS for the frame F1 at the head of the super-frame and a frame-sync FS for the subsequent 255 frames F2-F256. The bit patterns of super-frame-sync SS and frame-sync FS are selected to differ from each other.

The service bits SB, the details of which will be provided below, are grouped into four groups each including 77 bits. Each service bit contains data such as a command, a seat number, and so on.

Each of data packets PCTA-PCTD is formed of 32 bits and is independent of the others. As shown in FIG. 4C, each of the packets PCTA-PCTD is divided into four channels M1-M4, each being formed of 8 bits. Each of the channels M1-M4 contains a PCM signal obtained by sampling the audio signals L, R and A at a frequency of 32 kHz.

Since one frame contains four packets PCTA-PCTD and each packet has four channels M1-M4, 16-channel audio signals can be simultaneously transmitted in time-division multiplexed form by the use of one signal St.

Each channel is sampled at a sampling frequency of 32 kHz and encoded in 8 bits, so that it complies with the PCM audio standard of an 8 mm video tape recorder (VTR).

Data signals from the memory cartridges 141 through 148 are converted into a time-division multiplexed bit sequence signal by multiplexer 149 (shown in FIG. 1A). The time-division multiplexed signal emerging from multiplexer 149 is used as one channel of the 16-channel signals. The signal emerging from multiplexer 149 is cyclic, so that when the last bit of data from memory cartridges 141 through 148 is transmitted, the first bit of the data from these memory units is retransmitted.

Figure 4C:
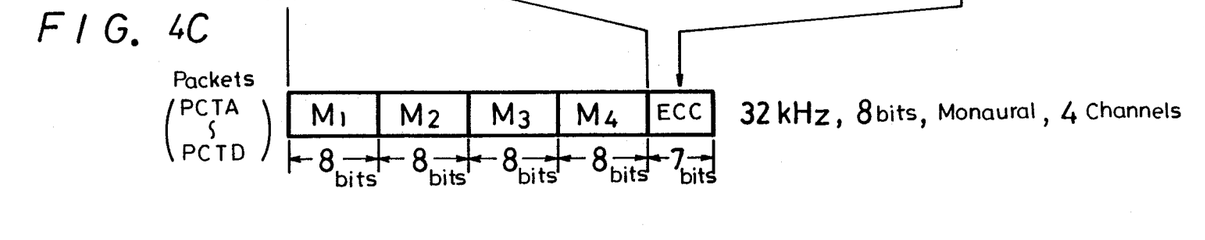

Each channel of the FIG. 4C signal is formed of eight bits, and eight memory cartridges 141–148 are provided. Accordingly, in the channel for transmitting data from cartridges 141–148, each of the first bit through the eighth bit of the channel corresponds to data from a different one of memory cartridges 141 through 148. Therefore, the transmission rate of data from each memory cartridge is 32 kbps.

The four error correcting codes ECCs respectively correct errors which may occur in the packets PCTA-PCTD.

Since the signal St has format determined as described above, the bit transmission rate thereof is calculated as follows:

$$168 \text{ bits} \times 32 \text{ kHz} \approx 5.4 \text{ Mbps}.$$

One half of the calculated value is the Nyquist frequency, so that the signal St can be transmitted in a video signal bandwidth.

As described above, each of the encoders 151 and 152 can time-division-multiplex sixteen channels of audio signals, and the time division-multiplexed signal can be frequency-multiplexed with other video signals.

Figure 5A:
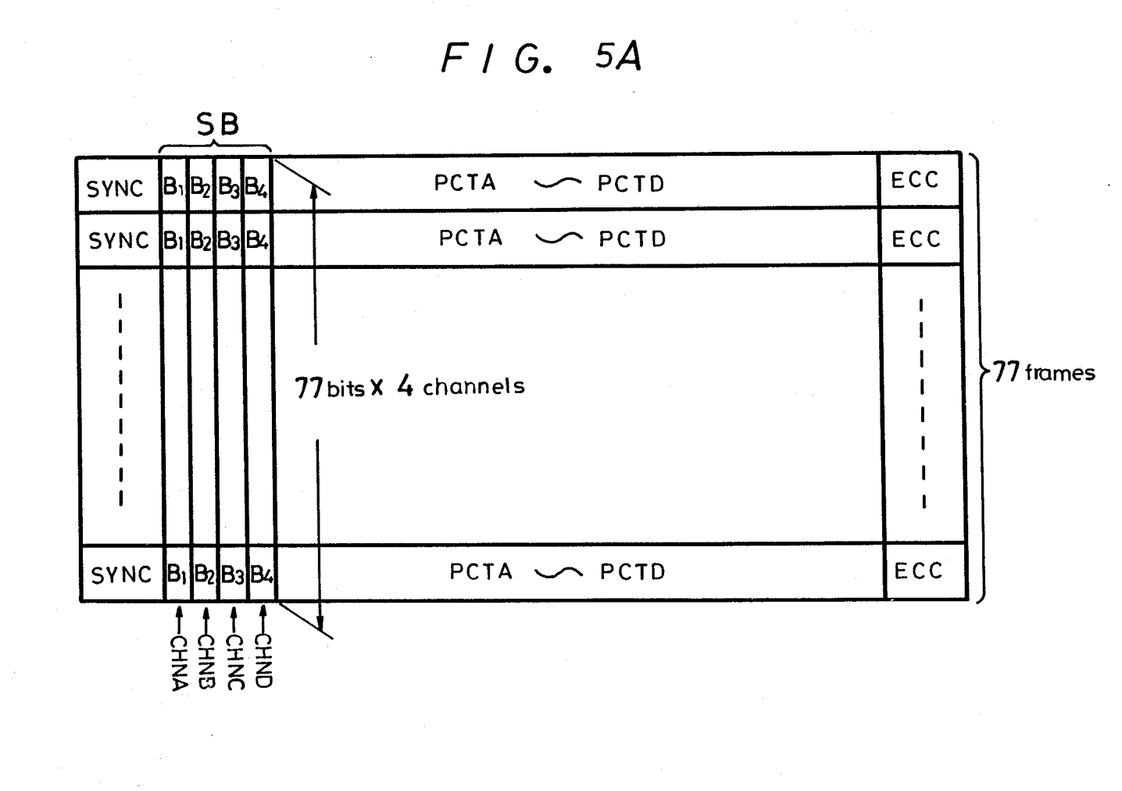

The service bits SB are preferably used in groups having a format as shown in FIGS. 5A–5D. To be specific, four service bits SB are provided for every frame, and may be designated $B_1$–$B_4$. Assuming that continuous 77 frames are vertically aligned as one group, as schematically shown in FIG. 5A, the service bits SB for this group have a dimension of vertical 77 bits × horizontal 4 bits.

Figure 5B:
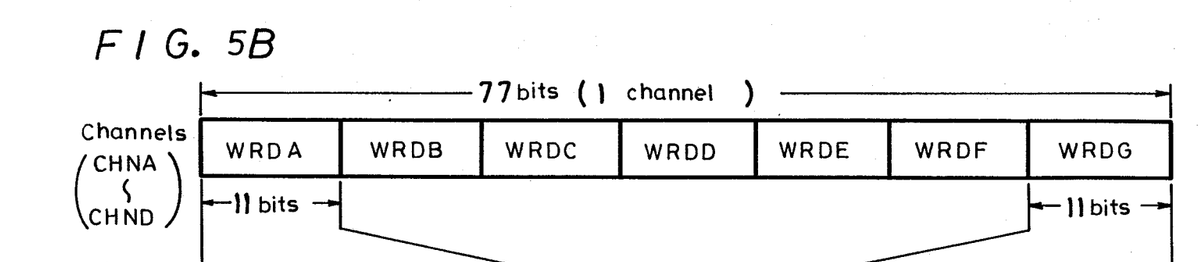

As shown in FIG. 5B, the service bits SB may be vertically grouped so that each set of 77 bits is designated as one channel. A first such channel CHNA includes 77 bits $B_1$ and second - fourth such channels CHNB–CHND include bits $B_2s$–$B_4s$, respectively.

Figure 5C:
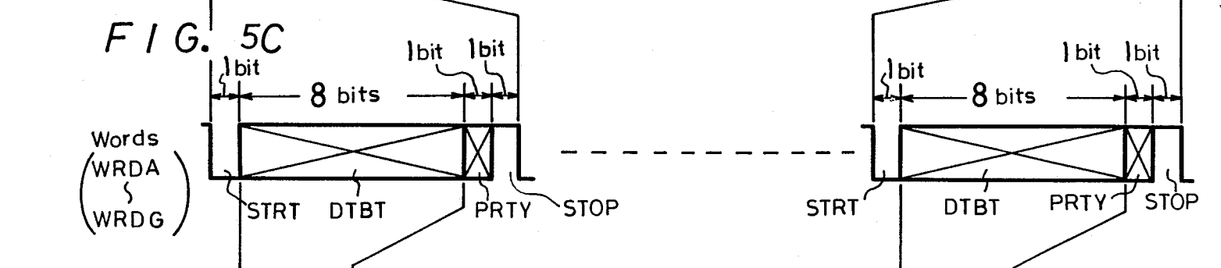

Each of the channels CHNA–CHND is divided into seven words WRDA–WRDG, each being formed of 11 bits as shown in FIG. 5B. Each word has its first bit set to "0" level and used as a start bit STRT, the subsequent eight bits are used as data bits DTBT, the next one bit used as a parity bit PRTY, and the last one bit determined to be "0" level and used as a stop bit STOP, as shown in FIG. 5C.

There is one data bit DTBT for each word in each of the channels CHNA–CHND, and there are seven words for each 77 frames. Therefore, there are seven data bits (seven bytes) for the 77 frames. Accordingly, there are 7 bytes × 4 channels of the data bits DTBTs in all.

Figure 5D:
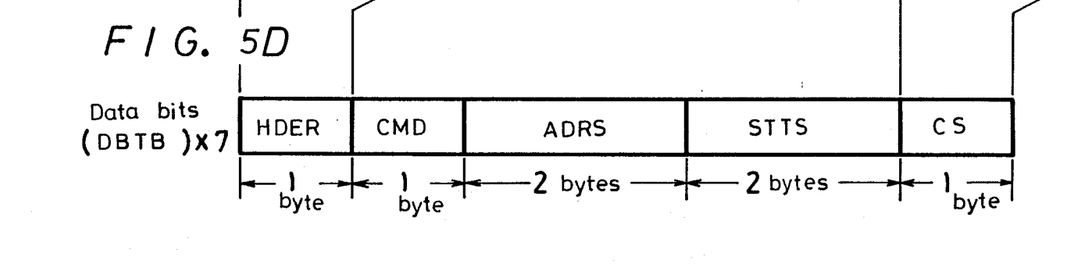

As shown in FIG. 5D, the second channel CHNB has its first byte set in a predetermined bit pattern ("AA" in hexadecimal) and is used as a header HDER, its second byte is used as a command CMD for identifying a maximum of 256 kinds of commands, the third and fourth bytes are used as an address ADRS indicative of a seat number (or a number of identifying a particular terminal unit), the fifth and sixth bytes are used as status information STTS indicative of data or parameters incident to the command CMD, and the last byte used as a check sum CS.

Therefore, transmitter 100 can specify desired ones of the terminal units 200 and control the operation of each corresponding reading light 212 and attendant call light 213 by use of the data bit DTBT in channel CHNB.

Since there is only one up channel for random data, the data bit DTBT of the first channel CHNA is used as a flag indicative of use or non-use of the up channel for the random data. The flag is set when the random data of the up channel is used. Therefore, each terminal unit 200 judges whether or not the up channel for random data can be used by assessing data bit DTBT of the channel CHNA. If the channel is in use, the terminal unit 200 delays transmission of a command (and data) to transmitter 100 until the channel becomes vacant.

The third and fourth channels CHNC and CHND are not defined.

In the up channel, above-mentioned service bits SB are transmitted in the formats shown in FIGS. 5B–5D at a bit rate of 32 kbps, equal to that of down channel transmission, in the PSK signal condition.

Next, another embodiment of the present invention will be explained with reference to FIGS. 6A and 6B. The parts in these drawings corresponding to those in FIGS. 1A and 1B are designated by the same reference numerals and the explanation thereof will be omitted.

Figure 6A:
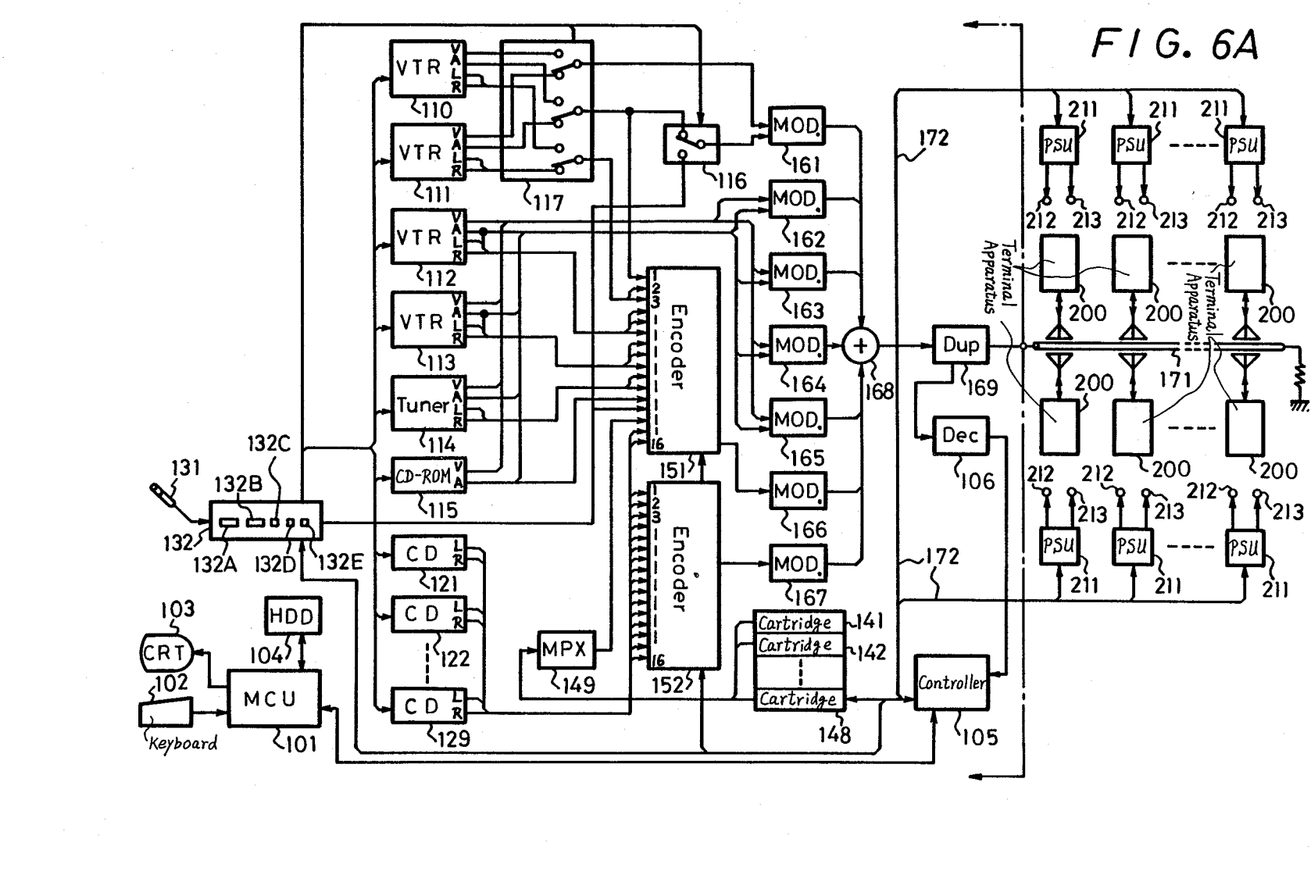
Figure 6B:
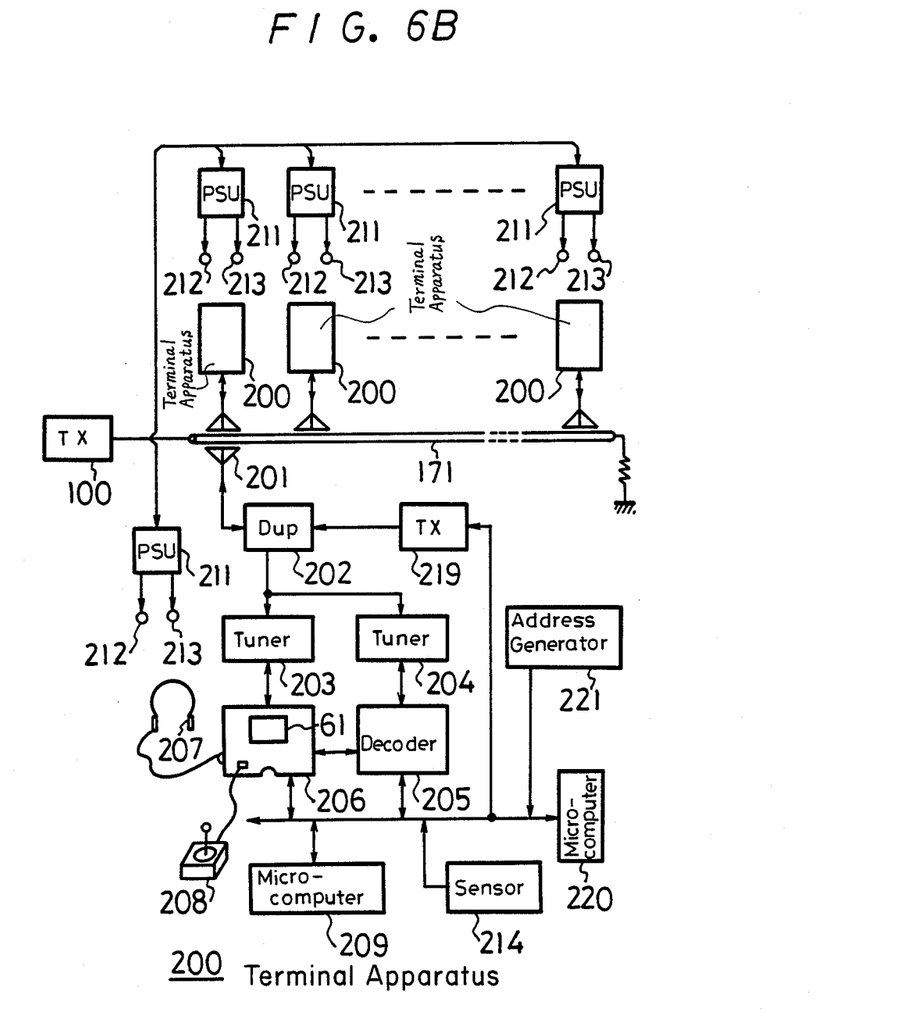

In FIGS. 6A and 6B, the PSU 211 and lights 212 and 213 are provided independently of the terminal unit 200, and control signals for controlling lights 212 and 213 are supplied to PSU 211 through a cable line 172 provided in addition to leaky cable 171. Each PSU 211 includes a switch unit for controlling at least one of the reading lights and at least one of the attendant call lights, and is preferably installed on the ceiling above the seats or on a wall adjacent one or more of the seats and has an address identifying function. Each control signal for controlling the lights 212 and 213 is supplied directly from controller 105 through cable line 172 to the PSU 211. Each control signal for lights 212 and 213 includes a signal indicative of the seat address for the relevant light so that the relevant PSU 211 turns on or off the relevant one of lights 212 and 213 upon detecting the control signal having the appropriate address. The embodiment shown in FIGS. 6A and 6B otherwise operates in the same manner as the embodiment of FIGS. 1A and 1B so that explanation of its manner of operation will not be repeated.

Although the embodiment of FIGS. 6A and 6B includes an additional cable line 172, it has the advantage that each control signal for lights 212 and 213 can be rapidly and accurately transmitted even when cable 171 is extremely occupied.

Figure 7:
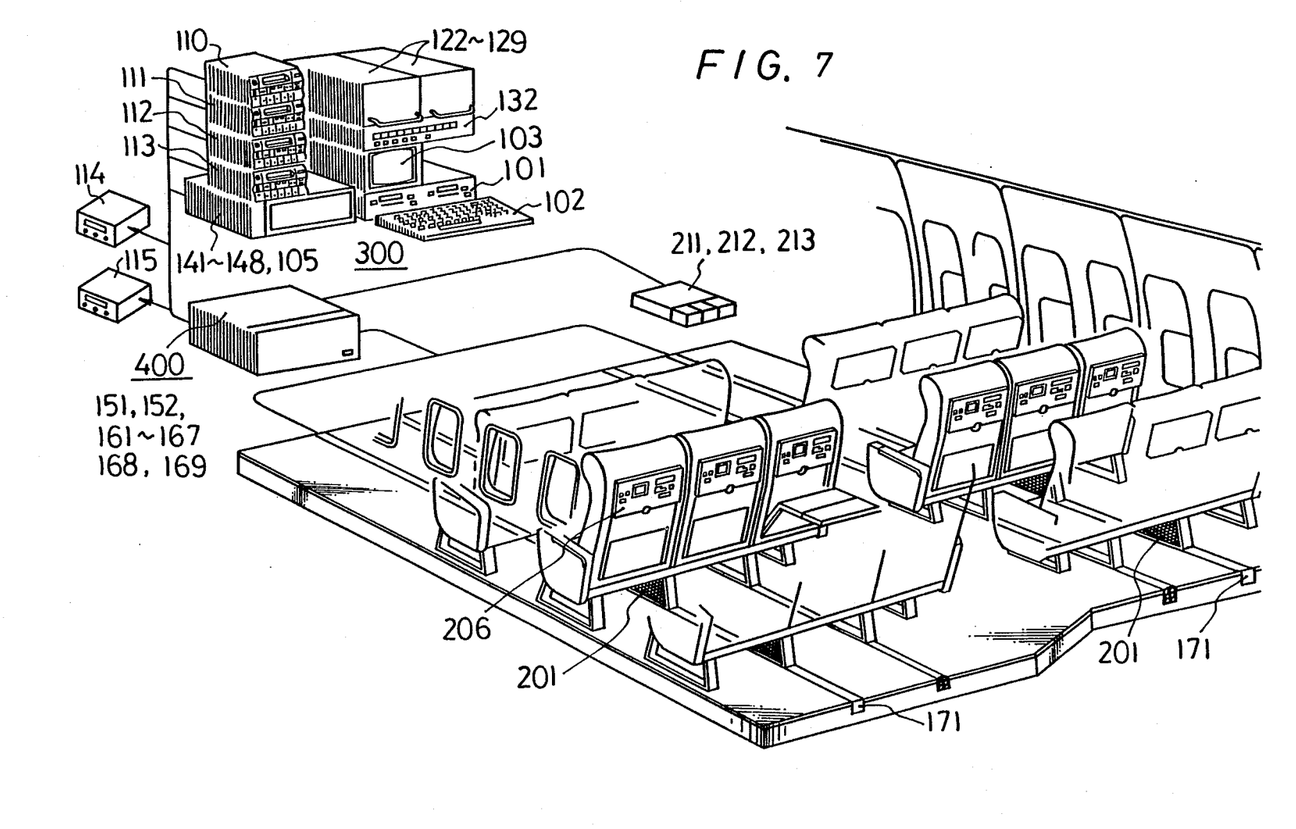
FIG. 7 is a perspective view of a preferred embodiment of the invention.

FIG. 7 shows a preferred embodiment of the service system of the invention which is installed in an aircraft. The components in FIG. 7 corresponding to those in FIGS. 1A and 6A are designated by the same reference numerals. The cartridges 141–148 and the controller 105 of FIGS. 1A and 6A are accommodated in a box 300, and the encoders 151 and 152, the modulators 161–167, the adder 168 and the duplexer 169 are accommodated in a box 400.

According to the present invention as described above, when a passenger operates switches 62 and 63, transmitter 100 centrally processes signals generated in the passenger's terminal unit in response to passenger's operation of switches 62 and 63 to thereby control the lights 212 and 213, and centrally monitors and processes the signals received from the passenger's terminal unit so that the passenger's requests can be quickly detected and promptly responded to.

The passenger's requests are centrally monitored by display 103 (i.e., each passenger's seat is provided with an attendant call light 213 whose status is monitored by display 103), so that it is possible easily to determine which passenger has requested a service and accordingly to improve services in the passenger cabin.

Further, in a preferred embodiment in which the service system of the invention is incorporated and combined with an audio/video system, the combined system is simpler than if the two systems were provided separately, and may more easily be extended than if the two systems were provided separately.

It will be apparent from the above description of several preferred embodiments of the invention that many modifications and variations could be effected by one skilled in the art without departing from the scope of the invention, as determined by the appended claims.

What is claimed is:

1. An aircraft service system, including:
   (a) a plurality of attendant call lights each servicing a different passenger seat in an aircraft;
   (b) a plurality of reading lights each serving a different one of the passenger seats;
   (c) a plurality of switch units, each controlling at least one of the attendant call lights and at least one of the reading lights;
   (d) a plurality of terminal units, each provided at a different one of the passenger seats, each terminal unit having an attendant call key, a reading light key, a means for generating an address identifying one of the passenger seats, a means for generating a request signal including the address in response to operation of at least one of the attendant call key and the reading light key;
   (e) a head end apparatus including a control signal generating means, wherein said control signal generating means is capable of generating an attendant call light control signal in response to each request signal generated in response to operation of one of the attendant call keys and a reading light control signal in response to each request signal generated in response to operation of one of the reading light keys, and wherein each said control signal includes a seat address identifying one of said attendant call and reading lights;
   (f) a means for transmitting said each request signal from said each terminal unit to the control signal generating means; and
   (g) a means for transmitting said each control signal to the switch unit controlling the light identified by the seat address included in said each control signal.

2. A service system according to claim 1, in which the head end apparatus also includes a controller means for receiving said each request signal from the control signal generating means and processing said each request signal for display.

3. A service system according to claim 2, in which the head end apparatus further comprises a display means connected to said controller means for displaying each said processed request signal.

4. A service system according to claim 2, in which said head end apparatus further comprises keyboard means connected to said controller means for entering request signals into the controller means for transmittal to the control signal generating means, and wherein the control signal generating means is capable of generating a control signal for controlling desired ones of said reading lights in response to each said request signal from the keyboard means.

5. A service system according to claim 1, in which said request signal transmitting means is a first cable line and said control signal transmitting means is a second cable line.

6. A service system according to claim 1, in which a single cable serves as said request signal transmitting means and said control signal transmitting means.

7. A service system according to claim 1, in which each said switch unit is capable of identifying the seat address of each said control signal.

8. A service system according to claim 6, in which said each terminal unit is coupled to at least one of the switch units, each said control signal is transmitted to the terminal units to be selectively forwarded to the appropriate switch units, and said each terminal unit further comprises means for identifying the seat address of each said received control signal and means for selectively forwarding to said at least on switch unit coupled thereto only those received control signals which have a seat address identifying one of the lights controlled by said at least one switch unit coupled thereto.

9. A service system according to claim 8, in which said head end apparatus further comprises encoder means for encoding said control signals, and said each terminal unit further comprises decoder means for decoding said encoded control signals.

10. A service system according to claim 9, in which the head end apparatus further comprises means for reproducing video signals and means for reproducing audio signals, wherein said audio signals are encoded by said encoder means, and wherein the head end apparatus also includes a modulator means for modulating said video signals, said encoded audio signals and said encoded control signals, a multiplexer means for multiplexing said modulated video signals, said modulated audio signals and said modulated control signals, said multiplexer means being connected to said cable, and wherein said each terminal unit further comprises means for receiving said multiplexed signals, a demodulator means for demodulating said video signals, said encoded audio signals and said encoded control signals, and for supplying the demodulated encoded audio signals and the demodulated encoded control signals to the decoder means, and wherein the decoder means is capable of decoding said encoded audio signals and said encoded control signals, a means for displaying the demodulated video signals, and an audio output terminal for receiving the demodulated, decoded audio signals.

11. A service system according to claim 10, in which said head end apparatus further comprises memory means for storing television game software, wherein said encoder means is capable of encoding said television game software, said modulator means is capable of modulating said television game software, and said multiplexing means is capable of multiplexing said encoded television game software with the modulated video signals, encoded audio signals, and encoded control signals, and said each terminal unit further comprises means for demodulating the television game software, and means for processing the demodulated television game software.

12. A service system according to claim 10, in which said each terminal unit includes a panel in which the attendant call key, the reading light key, the display means, and the audio output terminal are provided.

13. A service system according to claim 12, in which each said panel is provided on the rear side of one of said passenger seats.

14. An aircraft service method, including the steps of:
(a) at each of a plurality of terminal units provided at a respective plurality of passenger seats, generating a request signal identifying at least one of an attendant call light and a reading light serving the passenger seat at which the terminal unit is provided;
(b) transmitting each said request signal form the terminal unit at which it is generated to a head end apparatus;
(c) in response to each said request signal, generating at the head end apparatus a control signal for controlling the light identified by the request signal, each said control signal including a seat address identifying the light identified by the request signal;
(d) digitally encoding each said control signal at the head end apparatus;
(e) transmitting each said digitally encoded control signal from the head end apparatus to a plurality of switch units, each provided at a respective one of the plurality of passenger seats, and each capable of controlling at least one of the reading lights and at least one of the attendant call lights.

15. A method according to claim 14, also including the steps of:
(f) at said each switch unit, processing each said digitally encoded control signal to identify the seat address included in said digitally encoded control signal; and
(g) controlling each said light identified by each said seat address identified in step.

16. A method according to claim 14, wherein said each switch unit is coupled to one of the terminal units, and also including the steps of:
(h) at each said terminal unit, receiving and decoding each transmitted control signal and identifying the seat address included in each transmitted control signal; and
(i) at each said terminal unit at which a said seat address identified in step (h) identifies one of the lights controlled by the switch unit coupled to said terminal unit, supplying the decoded control signal to the switch unit coupled to said terminal unit.

17. A method according to claim 14, wherein each said request signal is transmitted to the head end apparatus over a first cable line, and wherein each said encoded control signal is transmitted from the head end apparatus to the switch units over a second cable line.

18. A method according to claim 14, wherein each said request signal and each said encoded control signal are transmitted to and from the head end apparatus, respectively, over a common cable.

* * * * *